United States Patent [19]

Van den Berk et al.

[11] Patent Number: 4,663,145

[45] Date of Patent: May 5, 1987

[54] DEVICE FOR AN METHOD OF WORKING UP PICKLING AND ETCHING LIQUIDS

[75] Inventors: Peter J. T. Van den Berk; Berend Knol; Franciscus J. M. Dubois, all of Zwolle, Netherlands

[73] Assignee: U.S. Philips Corporation, New York, N.Y.

[21] Appl. No.: 774,420

[22] Filed: Sep. 10, 1985

[30] Foreign Application Priority Data

Sep. 10, 1984 [NL] Netherlands ............... 8402751

[51] Int. Cl.$^4$ ............... C01B 7/18; C01B 17/90; B01J 8/08; F27B 15/00
[52] U.S. Cl. ............... 423/659; 423/488; 423/531; 423/DIG. 1; 423/DIG. 2; 422/204; 422/212; 422/213; 422/216; 432/27; 432/215; 156/642; 159/DIG. 29; 202/121; 201/3; 201/34
[58] Field of Search ............... 423/130, 531, DIG. 1, 423/DIG. 2, 481, 659, 488; 432/27, 215, 216; 422/204, 213, 216, 212; 156/642; 157/DIG. 29; 202/121; 201/3, 34

[56] References Cited

U.S. PATENT DOCUMENTS

| 1,506,104 | 8/1924 | Wolcott | 423/130 |
|---|---|---|---|
| 2,274,003 | 2/1942 | Sheppard | 422/216 |
| 2,311,984 | 2/1943 | Guild | 422/213 |
| 2,408,600 | 10/1946 | Berg | 422/216 |
| 2,471,844 | 5/1949 | Strelzoff | 423/481 |
| 2,494,695 | 1/1950 | Fischer | 432/215 |
| 2,504,215 | 4/1950 | Montgomery | 422/213 |
| 2,511,652 | 6/1950 | Shand | 422/213 |
| 2,571,342 | 10/1951 | Crowley, Jr. | 432/215 |
| 2,595,254 | 5/1952 | Hemminser | 423/437 |
| 2,600,425 | 6/1952 | Parry | 422/204 |
| 2,684,870 | 7/1954 | Berg | 422/216 |
| 2,741,547 | 4/1956 | Alleman | 422/213 |
| 2,937,213 | 5/1960 | Hutchings et al. | 502/202 |
| 3,050,368 | 8/1962 | Brooke | 422/216 |
| 3,653,424 | 4/1972 | Carlsson | 159/DIG. 29 |
| 3,898,745 | 8/1975 | Carlsson | 159/DIG. 29 |
| 4,069,107 | 1/1978 | Koppelman et al. | 202/121 |
| 4,076,504 | 2/1978 | Oshida et al. | 432/27 |
| 4,106,999 | 8/1978 | Koppelman et al. | 202/121 |
| 4,537,571 | 8/1985 | Baxel et al. | 432/27 |

FOREIGN PATENT DOCUMENTS

| 850449 | 9/1952 | Fed. Rep. of Germany | 422/216 |
|---|---|---|---|
| 2449647 | 10/1980 | France | 423/531 |
| 628321 | 8/1949 | United Kingdom | 432/215 |

Primary Examiner—Gary P. Straub
Attorney, Agent, or Firm—Norman N. Spain

[57] ABSTRACT

A device for and method of working up etching and pickling liquids consisting of a vertical furnace having one or more vertical reaction spaces through which balls move at a maximum packing density.

The furnace has a temperature gradient from the bottom (high) to the top (low). The reaction space and the balls consist of a material which is inert with respect to the liquid to be worked up. The liquid is introduced into the upper side of the furnace so that a film is formed in the heated surface of the balls. The salt dissolved in the liquid decomposes pyrolytically. The metal oxide is deposited on the surface of the balls and is removed therefrom after leaving the reaction space. The acid residue vapours are drained at the top and recovered in a separate absorber to the original pickling or etching acid.

7 Claims, 2 Drawing Figures

DEVICE FOR AN METHOD OF WORKING UP PICKLING AND ETCHING LIQUIDS

BACKGROUND OF THE INVENTION

The invention relates to a device for and and a method of working up used pickling and etching liquids.

Many chemical and electrochemical methods of etching and pickling metals are in use in which a metal object is subjected to a surface treatment or in which it is subjected to a non-mechanical metal-removing treatment. In all these methods metal goes into solution. Especially in continuous processes in which recirculation takes place the gradual increase in concentration of ions or the formation of a precipitate may considerably disturb or even stop the desired etching or pickling reaction. However, continuous regeneration is not always easy to perform so that in many processes large quantities of consumed liquids remain which as a rule cannot be disposed of as such in view of encironmental pollution and the value of the dissolved substances. Much is known already about the recovery of the metal gone into solution and the used etching and pickling agent, respectively. Much is known in particular about liquids in which a volatile acid or a salt of a volatile acid is present as a reagent.

A device for and a method of recovering hydrochloric acid and iron in the form of iron oxide is known from U.S. Pat. No. 2,471,844.

The device employed comprises a cylindrical reaction space which is accomodated at an angle with respect to the earth's surface and is filled with balls which can traverse through the reaction space, means for supplying the said liquids to the reaction space, means for treating the balls to a temperature at which at their surface the substances formed during etching and pickling, respectively, and present in the liquid to be worked up can undergo a pyrolysis reaction and the solvent evaporates, mechanical means for removing pyrolysis products present on the surface of the balls after the balls have left the reaction space, and means to process the released gases and vapours.

The means for heating the balls are embodied in the said U.S. Patent in a vertical furnace in which the balls of an inert material are introduced at the top, are heated at a temperature of, for example 1000° C. and are removed at a lower level and moved into a rotary kiln the axis of which encloses a small angle with the earth's surface and in which the iron chloride-containing liquids are also supplied. A reaction takes place at the surface of the balls with gases in which iron oxide is formed and hydrochloric acid in gaseous form escapes. If the liquid comprises iron in the trivalent form ferric oxide is deposited on the balls. However, if it comprises iron in the bivalent form oxygen must be added to the rotating furnace if ferric oxide is desired. The balls covered with iron oxide fall on a grate as a result of which the iron oxide thereof is removed. The balls are returned to the vertical oven. The escaping gases are applied to an absorption tower and thus converted into a hydrochloric solution of the desired strength. Ferric nitrate solutions and aluminium chloride solutions are worked up in a similar manner.

A disadvantage of the known device is that the rotary furnace in which the reaction with the agressive gases takes place involves great sealing problems.

SUMMARY OF THE INVENTION

The invention provides a device for recovering dissolved metal in etching and pickling agents, in the form of the oxide and of the etching and pickling agents, themselves, which device is of a very simple construction has a very low energy consumption per unit of recovered oxide and moreover excels by a great flexibility as regards the processing capacity.

The device according to the invention is characterized in that the means for heating the balls are embodied in a cylindrical furnace which is placed coaxially around the cylindrical reaction space. The furnace is constructed so that during operation a temperature gradient can be maintained between the area where the balls leave the reaction space (at a higher temperature) and the area of the reaction space to which the balls are supplied (at a lower temperature).

DETAILED DESCRIPTION OF THE PREFERRED EMBODIMENTS

Figure 1:
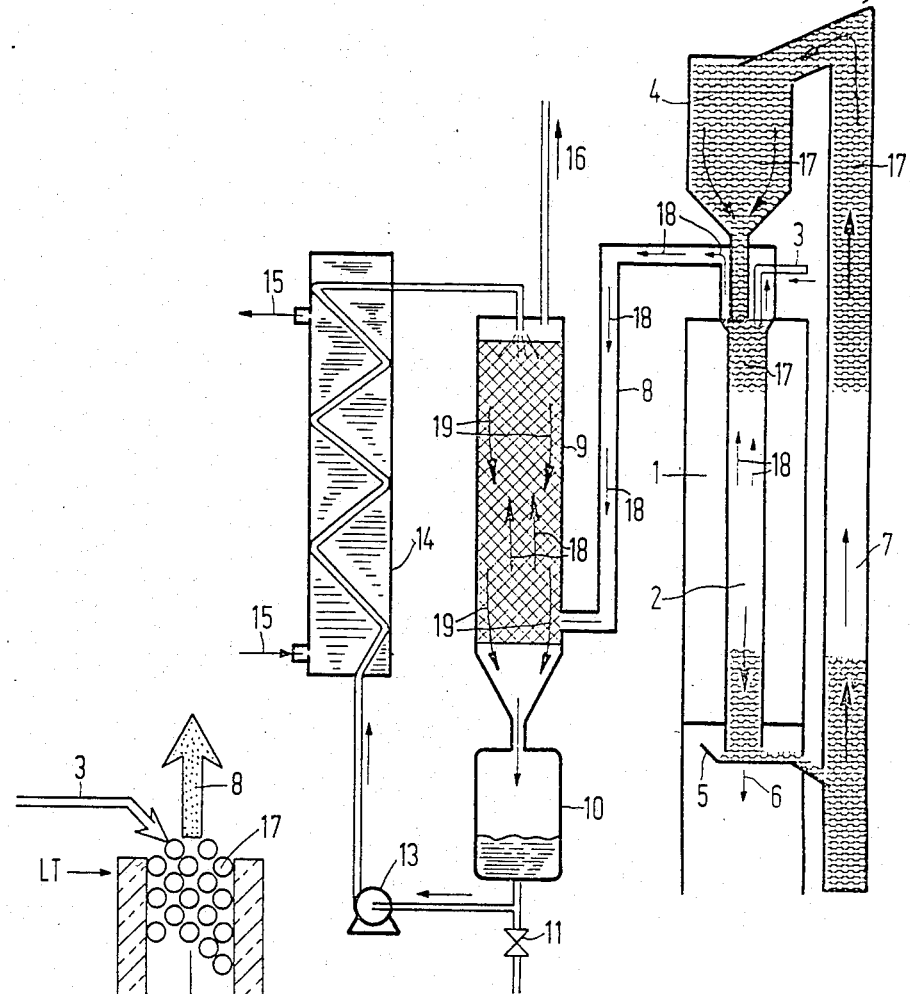
FIG. 1 is a diagrammatic view of the device of the invention.

According a preferred embodiment of the device the furnace and the cylindrical reaction space present therein are positioned vertically. The result of this is that the process occurs uniformly in a radial sense.

The temperature gradient in the reaction space, high at the bottom and low at the top, ensures that the reactions occur in steps. For example, for the working up of $AlCl_3$-containing aqueous solutions the following reactions take place from the top to the bottom in the space:

1. evaporation of the water
2. partial evaporation of the crystal water
3. pyrolysis of $AlCl_3$ to $Al_2O_3 + HCl$ (for this purpose water is necessary)
4. conversion of the oxide to the desired modification during the stay at the final temperature.

The device according to the invention excels by a great flexibility as regards the capacity. The diameter of the reaction space may be chosen at will. In an embodiment the reaction space has a diameter of 270 mm but 20 mm or 400 mm is also readily possible, while it is also possible to place at least two reaction spaces parallel to each other in a furnace. The reaction spaces consist of cylinders of an inert material, for example quartz glass or alundum.

Process parameters which influence the capacity of the reaction space are:
1. the value of the temperature gradient
2. the temperature of the balls
3. the temperature of the liquid
4. the transit volume of the balls
5. the flow volume of the liquid
6. the concentration of the liquid to be processed.

An advantage as compared with known devices is that there are no rotating parts.

The balls are chosen of an inert material; they preferably consist of a ceramic material, for example steatite or of glass ceramic. Metals, for example stainless steel, may also be used in some cases.

The energy consumption of the device is considerably lower than that of known devices. For example, with the same weight of processed material this is well over ⅓ lower as compared with a spray drying device.

The method of working up used etching and pickling liquids as carried out in the device according to the invention is characterized in that balls are applied to a cylindrical heated reaction space and are removed therefrom at such a rate that in the reaction space the balls move at a substantially maximum packing density, that the liquid to be worked up is introduced at the ball inlet side at such a rate that it distributes itself in the form of a liquid film over the surface of the balls, the reaction space is heated to a temperature which is sufficiently high for producing pyrolysis of the substances present in the liquid formed during etching and pickling, respectively, and for evaporating the solvent, the gaseous products formed at the ball inlet side are removed to an absorption tower and finally the removed balls, after the solid pyrolysis products present thereon have been removed, are returned to the reaction space.

The packing density of the balls which are transported through the reaction space must be so large as to ensure a good heat transfer from the furnace to the reaction space.

As has already stated a temperature gradient is provided in the reaction space between the ball inlet side of the cylindrical reaction space (lower temperature) and the ball outlet side (higher temperature).

The gases emanating from the reaction space are introduced on the lower side of an absorption column in counter flow with an absorption agent, the etching and pickling agents, respectively, being reformed, for example a concentrated HCl solution or HNO₃ solution which is drained on the lower side of the column. It is advantageous when a part of the drained solution is returned to the upper side of the absorption column via a cooling device. This facilitates the absorption of the reaction gases.

The balls with the powdery metal oxide deposited thereon leaving the reaction space on the lower side are preferably received on a shaking strainer, a vibrating sieve or a rotating dish. As a result of this substantially all the oxide is removed from the balls. The clean balls are returned to the upper side of the reaction space, for example, by means of a chain conveyor.

An embodiment of the device according to the invention is shown diagrammatically in the accompanying drawing.

FIG. 1 shows a furnace (1) comprising a reaction space (2) having a diameter of 270 mm, a length of 3 m and provided with a wall of a thickness of 20 mm and consisting of quartz glass. The liquid to be worked up is introduced at the inlet-duct 3, while the balls 17 consisting of steatite and having a diameter of 6 mm are introduced into the reaction space via the bunker 4. On the lower side of the reaction space 2 the balls covered with powder of the recovered oxide are received on a shaking strainer 5, the powder being drained at 6 and the clean balls are returned to the bunker 4 by means of the chain conveyer 7.

The hot gases 18 leaving the reaction space 2 are introduced into the absorption tower 9 through the pipe 8 in which they come in counterflow with the absorption liquid 19. The liquid is collected at the bottom of the tower 9 in the storage container 10 from which a part of the liquid is drained by means of valve 11 and a part is returned to the absorption tower 9 via a cooler 14 by means of a pump 13. The cooler 14 is cooled by means of running water 15. Suction is provided out at point 16 at the top of tower 9 so as to obtain negative pressure in the circuit 2-8-9. This is necessary in order that no return to the reaction space 2 takes place and also to prevent the reaction gases from leaving the reaction space on the lower side.

Figure 2:
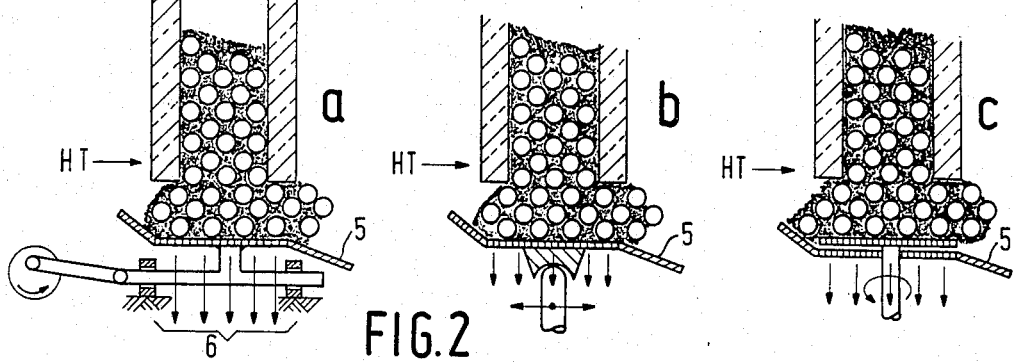
FIG. 2a is a diagrammatic view of the reaction space of the device of the invention.
FIG. 2b is a diagrammatic view of the bottom of the reaction space showing an alternate means for the removal of the metal oxide from the balls.
FIG. 2c is a diagrammatic view of still another alternate means for the removal of metal oxide from the balls.

FIG. 2 shows a part of the reaction space 2 in which balls 17 are introduced at the top and the balls covered with metal oxide are received at the bottom on a shaking strainer 5 through which the metal oxide 6 passes. The inlet of the liquid to be worked up is indicated by 3 and 8 is the outlet of the hot gases leaving the reaction-space. HT and Lt are the high temperature side and low temperature side respectively of the temperature-gradient in the reaction space.

FIGS. 2b and 2c show the lower part of FIG. 2a with a vibrating sieve and a rotating dish respectively instead of the shakings strainer 5.

A few examples of working up reactions are the following:

(a) etching liquid consisting of an aqueous Al(NO₃)₃ solution

The following reactions take place:

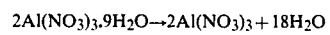

$$2Al(NO_3)_3.9H_2O \rightarrow 2Al(NO_3)_3 + 18H_2O$$

$$2Al(NO_3)_3 \rightarrow Al_2O_3 + 3N_2O_5$$

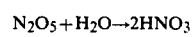

$$N_2O_5 + H_2O \rightarrow 2HNO_3$$

The following undesired side reactions may occur:

$$4HNO_3 \rightarrow 4NO_2 + 2H_2O + O_2$$

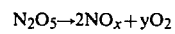

$$N_2O_5 \rightarrow 2NO_x + yO_2$$

The NO₂ formed can be absorbed again according to

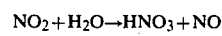

$$NO_2 + H_2O \rightarrow HNO_3 + NO$$

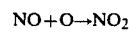

$$NO + O \rightarrow NO_2$$

The concentrated solution of HNO₃ is recovered.

(b) Regeneration of etching liquid consisting of an aqueous AlCl₃ solution

The following reaction occurs

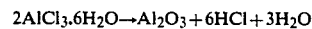

$$2AlCl_3.6H_2O \rightarrow Al_2O_3 + 6HCl + 3H_2O$$

Pure hydrochloric acid solution is recovered.

(c) Regeneration of etching liquid consisting of an aqueous solution of iron chloride When the iron is present in a bivalent form, oxygen must be supplied into the reaction space in order to recover Fe₂O₃. For trivalent iron oxyde this is not necessary.

(d) Regeneration of etching liquid consisting of an aqueous solution of $FeCl_3$ and $NiCl_2$ obtained from the etching of nickel-iron or fernicon In an analogous manner as described sub (b) or (c) a mixture of $Fe_2O_3$ and $NiO$ is obtained. This is an excellent starting material for the preparation of Ni-containing ferrites.

The following description represents the best mode of a method of working up used aluminium nitrite solutions, originating from an electrolytic etching process of aluminium foil in a nitric acid and aluminium nitrate solution, in accordance with the invention.

A device is used comprising a quartz pipe having an internal diameter of 170 mm, an external diameter of 200 mm and a length of 2000 mm. Steatite balls having a diameter of 6 mm and a density of 2.7 $g/cm^3$ are used; 100 of such balls having a pouring volume of 22 $cm^3$. The balls are transported through the pipe with a velocity of 150 $dm^3$/hr and the used etching liquid with a velocity of 100 kg/hr. The temperature at the entrance of the pipe at its top is 300° C. and at the exit at the bottom 550° C. The temperature of 300° C. is maintained at a zone of about 20% of the total length of the pipe and from the bottom of this zone till the bottom of the pipe there is a practically linear temperature-gradient.

In the 300° C.-zone the dehydratation of the $Al(NO_3)_3.9H_2O$ takes place and in the lower part of the pipe the decomposition of the $Al(NO_3)_3$ into $Al_2O_3$ and $N_2O_5$ takes place, the latter being converted into $HNO_3$ in the upper part of the pipe and in the absorber.

The $Al_2O_3$ and $HNO_3$ are recovered with a yield of about 95%.

What is claimed is:

1. A method of working up used etching and pickling liquids containing pyrolyzable impurities, said method comprising:
   (a) supplying inert balls to a reaction space positioned at an angle with respect to the earth's surface and supplied with entrance means for said balls and exit means for said balls, said balls being supplied to said reaction space and removed from said reaction space at a rate such that said balls fill said reaction space;
   (b) introducing the liquid to be worked up, into said reaction space at a rate such that said liquid is distributed in the form of a liquid film over the surfaces of said balls;
   (c) heating said balls in said reaction space to a temperature sufficiently high to produce pyrolysis of the impurities formed in said liquids during etching and pickling operations and to evaporate said liquid, said balls in said reaction space being subjected to a temperature gradient such that said balls leaving said reaction space are heated to a higher temperature than the balls enabling said reaction space;
   (d) processing gases and vapors formed during said pyrolysis reaction and released from said reaction space;
   (e) separating solid pyrolysis products from said balls after said balls have exited from said reaction space; and
   (f) returning said balls to said reaction space.

2. A device for working up used etching and pickling liquids containing pyrolyzable impurities, said device comprising a cylindrical reaction space positioned at an angle with respect to the earth's surface, inert balls filling said reaction space and capable of traversing said space, said cylindrical reaction space being provided with entrance means for said balls and exit means for said balls; means to supply said liquids to said reaction space; heating means to indirectly heat said balls in said reaction space to a temperature at which, at their surfaces, the impurities formed during etching and pickling operations respectively, and present in said liquids, are pyrolysed to solid products and the liquid evaporates, said heating means also providing a temperature gradient in said reaction space to maintain said balls upon entry into the reaction space at a lower temperature than said balls upon leaving the reaction space, said heating means being provided in a cylindrical furnace positioned coaxially around said cylindrical reaction space; means for processing gases and vapors formed during said pyrolysis reaction and released from the reaction space and mechanical means for separating said solid pyrolysis products from said balls after the balls have exited from the reaction space.

3. A device as claimed in claim 2, characterized in that the furnace and the cylindrical reaction space present therein are placed in a vertical position.

4. A device as claimed in claim 2, characterized in that the means for removing the pyrolysis products from the balls consist of a shaking strainer, a vibrating sieve or a rotatable dish.

5. A device as claimed in claim 2, characterized in that the balls consist of a ceramic material.

6. A device as claimed in claim 2, characterized in that it comprises means to return the balls from which the pyrolysis products have been removed to the inlet side of the reaction space.

7. A device as claimed in claim 6, characterized in that the said means for returning said balls is a chain conveyor.

* * * * *

UNITED STATES PATENT AND TRADEMARK OFFICE
CERTIFICATE OF CORRECTION

PATENT NO. : 4,663,145

DATED : May 5, 1987

INVENTOR(S) : PETER J.T. VAN DEN BERK ET AL

It is certified that error appears in the above-identified patent and that said Letters Patent is hereby corrected as shown below:

IN THE TITLE:

[54] "AN" should be --AND--.

IN THE CLAIMS:

Column 6, line 4, "enabling" should be --entering--.
    line 51, "said" should be --the-- (both occurrences).

Signed and Sealed this

Twelfth Day of January, 1988

Attest:

DONALD J. QUIGG

Attesting Officer                Commissioner of Patents and Trademarks